United States Patent [19]
Beck

[11] Patent Number: 5,962,095
[45] Date of Patent: Oct. 5, 1999

[54] STABILIZED FRUIT STONES

[76] Inventor: Warren R. Beck, 942 Winterberry Dr., Woodbury, Minn. 55125

[21] Appl. No.: 09/031,298

[22] Filed: Feb. 26, 1998

[51] Int. Cl.$^6$ .................................................. B32B 9/02
[52] U.S. Cl. ..................... 428/35.6; 428/304.4; 428/326; 428/903.3
[58] Field of Search ............................... 524/15; 426/309; 428/22, 23, 304.4, 35.6, 326, 903.3

[56] References Cited

U.S. PATENT DOCUMENTS

| | | |
|---|---|---|
| 3,676,392 | 7/1972 | Robins . |
| 4,133,930 | 1/1979 | Wright et al. . |
| 4,629,476 | 12/1986 | Sutt, Jr. . |
| 4,818,604 | 4/1989 | Tock . |
| 5,492,320 | 2/1996 | Hoffman et al. . |
| 5,643,342 | 7/1997 | Andrews . |
| 5,820,967 | 10/1998 | Gadkaree . |

*Primary Examiner*—Deborah Jones
*Assistant Examiner*—Jason Savage

[57] ABSTRACT

A new light weight particulate material is provided which comprises fruit (cherry) stones, or pits, stabilized against germination, weathering and general degradation caused by chemical or biological attack. Stabilization of the stones is accomplished by heat treatment alone or by heat treatment plus sealing of any openings in them. The stabilized stones are useful as a structural material, as a filler in solid syntactic composites, and as the primary component in tactic (open pore) composites. The loose stabilized stones can be used in applications such as "bean bags".

11 Claims, No Drawings

STABILIZED FRUIT STONES

This invention provides a new low-cost spheroidal particulate materials useful as a structural material and for a variety of other purposes where discrete, low weight particles are used. This new, particulate material comprises fruit stones, particularly cherry stones or pits, which have been stabilized against biological action within the stones by heat treatment. Optionally the particles have an exterior polymeric coating that seals the stones.

I have been unable to find any prior art in the patent, technical, or agricultural literature that suggests preserving or stabilizing cherry stones or pits. Nor are there any needs expressed which would provide an incentive to do so. According to published research seeds and fruit stones will not germinate when heated to 212 deg. F., although some hardy seeds still show signs of germination if heated to 135 deg. F. (Woody Plant Seed Manual, Forest Service, U.S. Dept. of Agriculture, Misc. Publication #654, June, 1948, U.S. Government Printing Office).

The U.S. production of Montmorency red cherries totals nearly 160,000 tons per year. This results in about 20,000,000 pounds of their stones, most of which would be available for stabilization processing.

Cherry stones or pits have been abundantly available for thousands of years. Generally they have been useless by-products of the cherry fruit business, except for their use as a free fuel. Disposal of this waste product has been a problem. To my knowledge no one has previously found a way to convert them to a product with commercial value.

When stabilized in the above manner the stones or pits are suitable for use in applications requiring permanence. Their stabilization results in long term weatherability, more resistance to chemicals and heat, and greater strength for structure integrity.

SUMMARY OF THE INVENTION

By my invention I convert cherry stones, and other fruit stones, to a useful product, namely, a lightweight (density of 1 gram per cubic centimeter or lower) particulate material useful as a structural material, e.g., as a filler in polymeric composite articles, or for a variety of other purposes where discrete particles of this nature are used. In brief summary, a product of my invention comprises a free-flowing mass of fruit stones, preferably cherry stones, which have been stabilized against biological action within the stones. (By "biological actions" it is meant biological processes that cause a significant change to the fruit stone, such as germination or rotting). Generally the stones are heated to a temperature of at least 250 deg. F. for sufficient time to essentially dry the kernel (i.e., the organic contents contained within the outer shell) of the stone. A major part of the kernel is volatilizable. Upon heating of the stone a major portion of the volatilizable organic material of the stone will be converted to a vapor and leave the stone.

The invention also provides novel composite articles that incorporate the heat-treated fruit stones. Such an article preferably comprises a polymeric matrix material and heat-treated fruit stones dispersed in the matrix material. Most often, the fruit stones constitute a majority of the volume of the article. In some composite articles, typically called tactic composites, the matrix material has voids which leave the article porous. In other composite articles, typically called syntactic composites, the matrix material substantially fills the space between the fruit stones and leaves the article essentially non-porous. However, the matrix material can include dispersed therein a particulate filler such as hollow glass microspheres (sometimes called glass bubbles) smaller in average diameter than the fruit stones.

DETAILED DESCRIPTION

Though my invention relates to all cherry stones, and indeed to all fruit stones, the discovery applies most practically to red (e.g, Montmorency) cherry stones because they are the most abundant and most extensively pitted. Large quantities of these stones are available, for example, in Michigan, New York, and Wisconsin. The Montmorency is preferred also because its stones are the most spherical and the smallest of the commercial varieties of cherries.

I have discovered that the cherry stones can be stored for at least two years before stabilizing without detrimental effect. They may be processed immediately, or they may be stored in air tight closed containers kept in unheated and uncooled shelters through typical Minnesota winters and summers. At any point they may be taken from storage and put through the stabilization process.

Stabilization is generally accomplished by heat treating or by sealing, or by both. The stones can be sealed in a protective matrix subsequent to heat treatment. The primary objective of the heat treating is to drive off the water and other volatiles. Such heat treatment will prevent germination. Heat treatment generally involves heating a mass of the fruit stones in an oven for a sufficient time and a sufficient temperature to remove a major portion, preferably substantially all, of the volatiles. Heating to a temperature of about 250 deg. F. or at least above 212 deg. F., for about an hour has been sufficient for heat treating red cherry stones. I have found that the preferred temperature to stabilize the stones is about 300 deg. F. to 350 deg. F., although any temperature above about 212 deg. F. may be used. Above 450 deg. F. it is necessary to exclude air to prevent burning. At the preferred temperature most of the easily decomposable components are eliminated. Treatment for less than an hour may be sufficient. Sealing of stones which still contain some volatilizable organic material may also stabilize the stones against biological action.

After heat treatment, dry storage of the stones will retain their integrity until they are used in composite structures of either the tactic or syntactic variety. In this condition they can also be used in "dry" applications such as bean bags.

For maximum integrity a protective sealer of resin should be applied to the stones. This should seal any openings such as the micropylar channels or the sometimes present incipient splitting of the stones. The resin applied generally should be no thicker than a normal paint layer and the mass should be forcibly agitated while the resin hardens or cures to prevent cohesion of the stones.

There are many ways to coat nodules like cherry stones. One of the simplist is the procedure I used in my laboratory studies. For this procedure I simply mixed a predetermined amount of catalyzed Shell Epon 828 epoxy resin with the stones and continued actively mixing until the resin cured and the coated stones would no longer stick to each other when the mixing was stopped. The mixing was done in a polyethylene pail using a hand held wood paint stirrer. To make a "tactic" structure the amount of resin is generally increased and it is only necessary to stop the mixing before hardening (curing) occurs and pack the stones into a mold or form to let it cure. "Tactic" structures are useful as a vacuum mold backup support. The amount of resin needed can also be judged by mixing and adding resin only until the stones appear to be well wet.

To form a "syntactic" structure sufficient resin is used to fill all the spaces between the stones and often a second smaller filler is added to the resin. Syntactic structures formed in this way are non-porous, unlike the tactic structures. They are useful for large castings such as lamp bases, table pedestals, and the like.

EXAMPLES

Most of the experimental work in developing these stabilized stones was done in a Structo gas fired grill. The grill is fitted with a dial thermometer which projects one inch into the interior of the grill, whereby it measures the interior chamber temperature. I constructed a wire mesh cage one foot long and six inches in diameter using wire with 3/16 inch openings. The cage has a one inch wood dowel projecting through it, and the dowel has a crank on one end. The dowel rests on Teflon faced supports outside each end of the grill so that it can be rotated easily. This is referred to herein as heat processor #2. The stones, after first being prepared by cleaning, drying or storing, or with no preparation, are placed in the cage and rotated through the desired schedule.

Some initial work was done in a Frigidaire kitchen oven. In this case the stones were placed on a wire screen before placing them in the oven. This is referred to as heat processor #1.

Some additional work was done in an Amana Radarange kitchen microwave oven. Here the stones were tied in a cotton cheesecloth bag and placed in the oven. This is referred to as heat processor #3.

Having described the equipment I used for my heat treatment and coating of cherry stones I will now describe results obtained with this equipment. It is to be understood that the equipment I used is for illustration only, and any equipment may be used that provides the desired results.

All of the stones used in my studies were from red Montmorency cherries and were obtained from Seaquist Orchards in Door County, Wis. Following are examples of my stabilized stones.

Example #1

One pint of stones was stored in a closed container for two days after being separated (pitted) from the cherry fruit. About two dozen of these were then placed on a wire screen tray in my processor #1 at 200 deg. F. Samples were taken as follows:

A. After 2 hours at 200 deg. F.
B. After an additional 45 minutes at 275 deg. F.
C. After an added 15 minutes at 350 deg. F.
D. After still another 30 minutes at 350 deg. F.

Following are observations on the above samples:

A showed no splitting and was tan in color. The kernel was tan-brown and soft.

B showed no splitting and was darker. The kernel was darker and slightly brittle.

C showed no splitting and was very dark. The kernel was darker, smaller, and very brittle.

D showed no splitting and was still darker. The kernel was carbonized and reduced in size to 1/8 inch or less, and was porous and crumbly.

All of the, above processed stones float on water, unlike the unprocessed stones. 300 to 350 deg. F. is seen to be the preferred temperature to use if the stones are to be used unsealed. Below this temperature there could be sufficient organic material left in the kernel to cause some decay if left in moist, warm, open storage without seal coating.

Example #2

1/2 pound of unwashed cherry stones was placed in processor #2 after 2 years storage in a closed glass container kept in an unheated, uncooled shed in Minnesota. The processor cage was rotated once every 2 seconds for one hour at 350 to 375 deg. F. The resulting pits are dark brown and float on water. Very few show any sign of splitting. The kernel is very dark, crumbly, and shrunken.

Example #3

This is identical to example #2 except at the pits were washed free of cherry meat. This resulted in a final light brown color.

Example #4

2400 cc. of pits processed as in example #2 was placed in a 3 gallon plastic pail. Into this was poured 140 cc. of epoxy resin. The epoxy was comprised of a 2 to 1 mix of Shell Epon #828 (diglycidyl ether of bisphenol A) and Cardolite hardener. Mixing was done with a wood paint stirrer. When well mixed about half of the batch was packed into a polyethylene plastic mold and allowed to cure without further stirring. This is example #4A. It is a rigid, open-pored, "tactic" structure.

Mixing was continued on the remaining half of the original batch until it cured as loose, free-flowing pits. This is example #4B.

Example #5

About 100 grams of unwashed stones, taken directly from harvesting and pitting, was placed on a wire screen in processor #2 at 450 deg. F. for 40 minutes. There is no sign of splitting. The pits are black and appear to have shrunk very slightly. The kernel is black and shriveled to almost nothing. The shell is still strong and its inner surface is still smooth and shiny.

Example #6

This is identical to #5 except that the pits were washed free of cherry meat before processing. Results all appear the same.

Example #7

Twenty cherry pits, unwashed and stored in a closed glass container for 2 years, were placed in a large glass vial with a metal cap perforated to allow release of volatiles. The vial was placed in processor #2 at 500 deg. F. where it was held for thirty minutes. The resulting pits are black, still strong, but decreased in diameter by about 15%. Incipient splitting was insignificant. Some soot evolved from the pits and was deposited on the inner wall of the vial. Kernels were black, fragile, porous, and reduced to almost nothing.

Example #8

Ten washed pits which had been stored for 2 years in a closed glass container, were placed in processor #3. The unit was turned on low for 2 minutes. The stones appeared to be unchanged.

Example #9

The same pits as were run in example #8 were run 5 minutes on high in processor #3. The exterior appeared to be unchanged, but the kernel is hard, brittle, and darkened.

Example #10

A syntactic casting was made in the following manner: 500 cc. of polyester boat resin was put into a polyethylene pail. To this MEK peroxide catalyst was added and mixed thoroughly. 1 and ¼ liters of C15 3M Glass Bubbles was added and mixed. 1 and ¼ liters of cherry pits, processed as in example #2, was added and mixed until uniform. This mix was then cast in a 12 inch square polyethylene pan 2 inches high. After curing the casting was removed and the density was measured as 0.45 grams per cc.

USES FOR STABILIZED CHERRY STONES

I have identified several uses for stabilized cherry stones which would provide a market for them if the price is acceptable. Example #10, above, describes a syntactic structure which would be suitable for making yacht rudders. In that use it would be prepared as a trowellable mix which would be formed in a clamshell type mold. A similar use for syntactic composites of this type would be in the fabrication of lamp bases, table bases, and other massive castings. A smaller particle may be combined with the stones, as in example #10, or a second smaller particle may be added. These would be known as bimodal or trimodal composites, respectively. If the sizes differ by at least a 7 to 1 ratio a high packing factor can be achieved. Since the packing factor for one normal size distribution is about 65% it follows that the packing factor for a bimodal system could be 65 plus 0.65 times 35=87%, and for a trimodal mix it could be over 90%. This would reduce the resin requirement to less than 10% by volume. The high content of filler, mostly cherry stones, will act as a heat sink and inhibit cracking from excessive exotherm.

A second type of use for cherry stones would be as a "tactic" structure. One application of this type of structure is as a backing for vacuum thermoforming molds. In this case the stones are mixed with enough of a two part resin (preferably epoxy) to make them appear well wet, then they are packed behind the pin-hole perforated mold and allowed to cure. The system is closed in so that a vacuum can be pulled through the open-pore tactic structure and thermoformable plastic sheets can be drawn down on the mold. Another use for this type of structure would be as a structure component for buildings. In this case the stones would be mixed with the resin as in the thermoforming use above. This would form a porous tactic wall but could be sheathed in fiberglass or wood veneer.

A third type of use would be as a filler for bean bags, "beanbag" furniture, or large versions of the "Beanie" babies currently a popular toy item.

A fourth use is as a spacer in laminated structures such as boat hulls or flat panels. Red Montmorency cherry stones are remarkably uniform in size. The stones are aspherical in shape and the smallest diameters average between 5 and 6 millimeters in size. This makes it ideal to serve as a spacer in tactic or syntactic laminates of this thickness. A laminate generally comprises layers of polymeric materials or polymeric materials containing another component such as reinforcing fibers, fabric or fillers. Thicker laminates or panels can be made by adding layers to make a multilayer structure.

What is claimed is:

1. A free-flowing mass of spheroidal fruit stones from which a major portion of volatilizable organic material has been removed to stabilize the stones against biological action, said processed stones being buoyant in water, and strong walled for structural use.

2. Stones of claim 1 which have been coated with a thin layer of a polymeric material that is nontacky at room temperature.

3. A free-flowing mass of fruit stones which have been biologically stabilized by removal of a major portion of volatilizable organic material, are about one centimeter or less in diameter, and are individually coated with a thin layer of polymeric material that is nontacky at room temperature.

4. A structure which comprises fruit stones that are about one centimeter or less in diameter and are individually coated with a thin layer of polymeric material that is nontacky at room temperature, wherein the fruit stones have been assembled and packed together and the polymer coating is then cured, resulting in a rigid, open-pored structure.

5. A composite article comprising a polymeric matrix material and fruit stones dispersed in the matrix material, said fruit stones being biologically stabilized by removal of a major portion of volatilizable organic material and constituting a majority of the volume of the article.

6. The article of claim 5 having voids in the matrix material between the fruit stones.

7. The article of claim 5 in which the matrix material substantially fills the space between the fruit stones.

8. The article of claim 7 in which the matrix material further comprises a first particulate filler smaller in average diameter than the fruit stones.

9. The article of claim 8 in which the matrix material further comprises a second particulate filler smaller in average diameter than the first particulate filler.

10. An article of claim 8 in which the particulate filler are hollow glass microspheres.

11. A laminate which comprises a monolayer of cherry stones biologically stabilized by removal of a major portion of volatilizable organic material.

\* \* \* \* \*